Patented Mar. 12, 1935

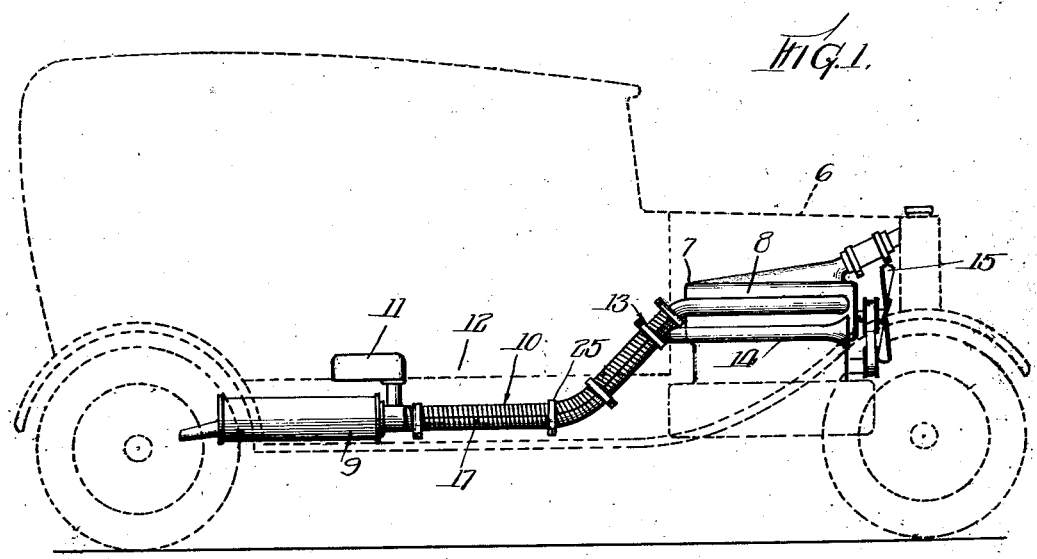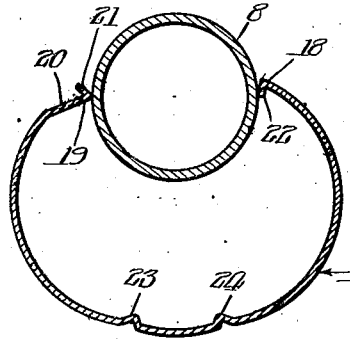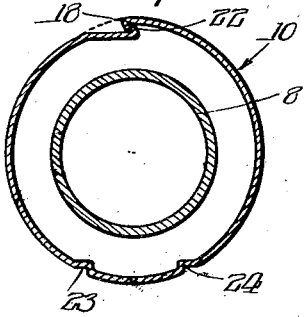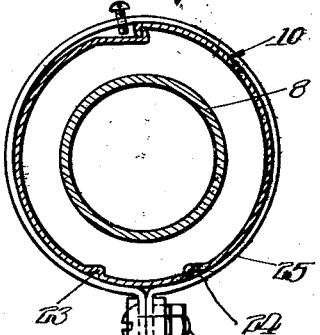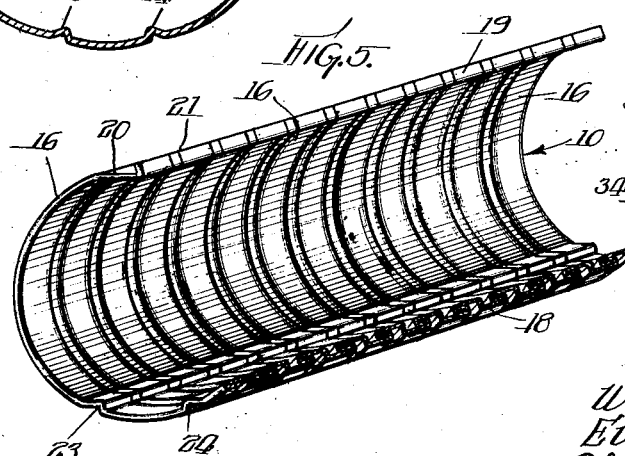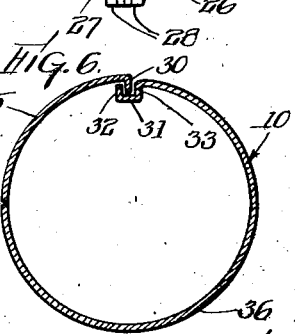

1,993,965

UNITED STATES PATENT OFFICE 1,993,965

TUBING

Wallace M. Huck and Evar J. Lindberg, Chicago, Ill., assignors to Chicago Tubing and Braiding Company, Chicago, Ill., a corporation of Illinois Application February 3, 1930, Serial No. 425,462

1 Claim. (Cl. 137—75)

This invention relates to tubing in general, and particularly to flexible metal tubing of the helical type.

When installing a heater in an automobile, it is usual that a pipe is inserted about the exhaust line, and this pipe has communication with a heater mounted on the automobile floor, whereby the heat driven off by the exhaust piping will be carried through the pipe and heater member and into the interior of the car to heat the same. In order to apply this pipe about the exhaust line, it is necessary to either cut the exhaust line or disconnect the exhaust line from the muffler. In either case, the installation is expensive. The present invention makes provision for installing a pipe or tubing about the exhaust line without the necessity of cutting the exhaust line or disconnecting the line from the muffler. The means employed consist in providing new and novel means for splitting the pipe longitudinally so that it may be inserted longitudinally over any existing pipe line.

The primary object of the invention is to provide tubing which can be inserted longitudinally over a member such as a pipe.

Another object of the invention is to provide flexible helically formed metal tubing, which can be inserted longitudinally over a pipe or other member, and which is provided with interlocking means for securing the tubing together longitudinally.

Another object is to provide flexible metal tubing with a longitudinal slit to permit the tubing to be inserted longitudinally over a pipe or other member, and which is provided with interlocking means at the edges along the slit, whereby the tubing may be snapped into position.

A further object is to provide flexible helically formed metal tubing with a longitudinal slit, which is provided with turned lips on each side of the slit for interlocking engagement with each other, which is provided with a depression along one side, whereby the peripheral diameter of the tubing will not be increased when it is interlocked longitudinally, and which is provided with crimps formed longitudinally on the body of the tubing to give hinge-like effect to the tubing, whereby it may be easily spread apart and springingly or resiliently urged together to closing position.

Numerous other objects and advantages will be apparent throughout the following specification.

The invention comprises in general, flexible metal tubing, which is made up of a continuous spirally formed strip having interlocking edges, whereby a continuous flexible tubing is formed when the edges are interlocked. This tubing is split longitudinally, and one edge is bent over substantially flat with upstanding lips provided at the free end of the flattened portion. The other free end of the tube along the slit is provided with a down turned lip, which is adapted to engage with the upturned lip, the flattened portion taking up the space which the down turned lips would ordinarily require to maintain the tube within its ordinary peripheral limits when the edges are locked. This split tubing is substantially springy and normally tends to spread apart. When the lips are engaged or interlocked, this springy action tends to hold the lips in interlocked position to prevent opening of the tubing. The tubing may also be crimped longitudinally thereof at one or more places to provide a hinge-like portion for the tubing to permit the tubing to be easily compressed to open it or to be easily contracted to cause interlocking of the lips.

The accompanying drawing illustrates a selected embodiment of the invention and the views therein are as follows:

Figure 1 is a detail elevation of a heating device operatively connected to an automobile;

Figure 2 is a detail sectional view showing the improved tubing partially inserted over an exhaust line;

Figure 3 is a similar view showing the tubing arranged about the exhaust line and in interlocked position;

Figure 4 is a view similar to Figure 3 showing clamping means arranged about the tubing to maintain the lips in interlocked position;

Figure 5 is a detail perspective view showing the manner in which the improved tubing is constructed; and Figure 6 is a detail sectional view showing a modified form of providing a hinge effect to the tubing and a modified form of arranging and forming the interlocking means.

Referring to the drawing, 6, generally, designates an automobile having the usual engine 7 to which an exhaust line 8 is operatively connected. The exhaust line extends in the position shown in Figure 1, and is operatively connected to a muffler 9. A pipe line 10, which in the present instance is the improved flexible tubing, is arranged over the exhaust line 8 and has communication with a heater element 11, preferably mounted on the floor 12 of the automobile. The forward end 13 of the tubing 10 is provided with an intake line 14, whereby air circulated by the fan 15 is driven through the tubing 10, heated by the exhaust pipe 8 and then passed through the heater element 11 to warm the interior of the car.

The improved tubing 10 is preferably made up of a single strip 16, which is helically or spirally arranged about a circumference, and is provided with interlocking means at its upper and lower edges, as clearly shown in Figure 1 for forming continuous flexible metal tubing.

The completed tubing is split longitudinally along the line 17, Figure 1, to provide the longitudinal free edges 18 and 19. The free edge 19 is flattened at 20, and a lip 21 is bent over from this flattened portion, as clearly shown in Figures 2 to 5. The free end 18 is provided with a down turned lip 22, which is adapted to engage and interlock with the upturned lip 21. The material from which the tubing is made is relatively resilient and tends to spread apart. When the lip 22 is engaged and interlocked with the lip 21, this springy condition tends to keep the lip 22 into interlocked engagement with the lip 21. By providing the flattened portion 20, the seam or ridge formed by the interlocking of the lips is located within the peripheral circumference of the tubing, as shown in Figure 3.

In order to render the tubing more flexible, it may be crimped longitudinally at 23 and 24 to provide a hinge action, whereby the tubing may be more easily spread apart and then snapped into position. To prevent the tubing from opening, clamps 25, Figure 4, may be installed about the tubing at certain intervals, and these clamps are maintained in fixed position in any suitable manner, such as by a nut 26 engaging a bolt 27, which passes through the flanges 28 of the clamps.

In Figure 6, the tubing 10 is provided with a down turned lip 30 which is received in a groove 31 which is formed between the portions 32 and 33. The portions 32 and 33 act to prevent movement of the interengaging members, particularly should the clamps shown in Figure 4 be tightened beyond normal position. This present construction confines the lip 30 between the portions 32 and 33 which act as abutments or stops for the lip 30 and prevents disengagement of the lip 30 from the groove should pressure be applied to the outside of the tubing. These portions or abutments 32 and 33 answer the same purpose as the screw shown extending through the clamp shown in Figure 4. This screw prevents one edge of the tubing from moving beyond the screw while movement in the reverse direction is prevented by the engagement of the lips. In either case it is assured that the tubing will not open should pressure be exerted thereagainst by accident.

Also in Figure 6 a hinge action is provided by cutting the tubing part-way through the material as indicated at 34. This cutting performs the same function as that performed by the crimps 23 or 24. This part-way cut, or if crimping is desired, a crimp, is preferably made at a point less than 180 degrees from the slit on the side on which the lip 30 is arranged. By placing the cut or crimp in this position and as shown at 34 in Figure 6, the portion 35 of the tubing is relatively short while the remaining portion 36 is relatively long. In operation the portion 36 is the movable portion as the groove 31 must be pressed under the lip 30 to cause interlocking of the two ends at the slit. The portion 34 thus has a long range of movement and prevents the tubing from being pressed beyond its elastic or resilient characteristic and become permanently deformed. In other words, if pressure is forced against the tubing, the part or portion 36 must move inwardly and the edge 32 would then engage the inside of part or portion 34 and prevent further movement of the portion 36, thereby preventing it from becoming permanently collapsed, and permitting the tubing to retain its resiliency.

In operation the tubing, such as shown in Figure 5, is spread apart and placed over the exhaust line 8, Figure 2, and when inserted over the exhaust line, is interlocked together as shown in Figure 3. The connection to the air means 14 and to the heater is made, and the clamps 25 are then secured thereabout for holding the tubing in proper operative position. When the tubing is to be removed from the exhaust line, it is only necessary to press on the flattened portion 20 to disengage the lip 21 from the lip 22, the springy action of the tubing causing it to spread apart, as shown in Figure 5, when it may be pulled off from the exhaust line.

The invention provides a novel means for making the necessary connections to an automobile heating element. By spreading the tube longitudinally the tube can be inserted longitudinally over the exhaust line and then collapsed sufficiently to bring the lips into interlocked position. The resiliency of the tubing causes the lips to remain interlocked, and a slight pressure along one of the edges adjacent the slit permits the lips to be disengaged and the tube readily removed.

Changes may be made in the form, construction, and arrangement of the parts without departing from the spirit of the invention, or sacrificing any of its advantages, and the right is hereby reserved to make all such changes as fairly fall within the scope of the following claim.

The invention is hereby claimed as follows:

As a unitary structure, a laterally flexible metallic tube split lengthwise, the edges defining said split being removably interfitted, said tube being deformed along a pair of substantially parallel spaced lines said lines being also substantially parallel to the edges defining the split thereby to facilitate spreading of the tube.

WALLACE M. HUCK.
EVAR J. LINDBERG.